(12) United States Patent
Freitas et al.

(10) Patent No.: US 9,383,936 B1
(45) Date of Patent: Jul. 5, 2016

(54) PERCENT QUOTAS FOR DEDUPLICATION STORAGE APPLIANCE

(71) Applicant: EMC Corporation, Hopkinton, MA (US)

(72) Inventors: Ornat S. Freitas, Raleigh, NC (US); Jagannath Srinivasan, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 615 days.

(21) Appl. No.: 13/786,100

(22) Filed: Mar. 5, 2013

(51) Int. Cl.
*G06F 17/30* (2006.01)
*G06F 3/06* (2006.01)

(52) U.S. Cl.
CPC .................................. *G06F 3/0641* (2013.01)

(58) Field of Classification Search
CPC .................................................. G06F 17/3007
USPC ........................................................ 707/692
See application file for complete search history.

(56) References Cited

U.S. PATENT DOCUMENTS

| | | | | |
|---|---|---|---|---|
| 5,960,451 A * | 9/1999 | Voigt | ..................... | G06F 3/0605 360/902 |
| 8,554,809 B1 * | 10/2013 | Zhou | ......................... | G06F 7/00 707/821 |
| 8,700,578 B1 * | 4/2014 | Varadan | ................... | G06F 17/30 707/692 |
| 2010/0313036 A1 * | 12/2010 | Lumb | ................... | G06F 21/602 713/189 |
| 2011/0106802 A1 * | 5/2011 | Pinkney | ............. | G06F 17/30085 707/737 |
| 2011/0113211 A1 * | 5/2011 | Fachan | ................... | G06F 3/0605 711/163 |
| 2013/0232179 A1 * | 9/2013 | Chhaunker | ......... | G06F 17/3007 707/827 |

OTHER PUBLICATIONS

Article entitled "Storage Quota Management and Provisioning with EMC Isilon Smartquotas", by EMC, dated Apr. 2012.*
Article entitled "Achieving Storage Efficiency Through EMC VNX File Deduplication and Compression", by EMC, Copyright 2011.*

* cited by examiner

*Primary Examiner* — Mahesh Dwivedi
(74) *Attorney, Agent, or Firm* — Blakely, Sokoloff, Taylor & Zafman LLP

(57) ABSTRACT

In one embodiment, the storage system maintains a plurality of usage records corresponding to a plurality of logical file system namespaces representing one or more directories each having one or more files, each file being stored in the storage system as a plurality of segments in a deduplicated manner. In one embodiment, the storage system identifies a first set of the usage records corresponding to a first of the file system namespace, wherein the first set of usage records contains information of logical and physical storage space used by one or more of the file system namespaces. According to one aspect of the invention, the storage system determines a percentage of the storage system available to the first file system namespace based on the first set of usage records and a provisioned percent quota.

18 Claims, 7 Drawing Sheets

PERCENT QUOTAS FOR DEDUPLICATION STORAGE APPLIANCE

FIELD OF THE INVENTION

Embodiments of the present invention relate generally to data storage systems. More particularly, embodiments of the invention relate to determining a percentage of the storage system that is available to a user based on a percentage quota.

BACKGROUND

On a backup storage appliance, system administrators often divide storage for different collections of backup data, e.g., backup directories may be created for different user groups. For example, separate backup directories may be created for sales, development and customer support. The prevailing solution to dividing storage is to assign a quota for each backup directory. Conventionally, there are two basic types of disk quotas. The first, known as a usage quota or block quota, limits the amount of disk space that can be used by provisioning a maximum byte usage for the backup directory. The second, known as a file quota or inode quota, limits the number of files and directories that can be created on the backup directory. Through the use of quotas, system administrators are better able to manage backup storage appliance space. Using a quota setting for backup directory allows a storage appliance to report available space for a backup directory, i.e., the difference between used and allotted storage space. The report of available space allows system administrators to recognize when storage usage approaches quota limits and take action to prevent the quota limit from being reached. Additionally, the report enables administrators to prevent overuse of storage space, i.e., stop backup file writes when a quota limit is reached. This prevents exceeding the allotted/provisioned storage space, thus ensuring that one backup directory will not encroach on another backup directory's space.

Block quotas and file quotas work well for conventional undeduplicated storage systems. However, with deduplicated backup storage, a new type of quota is needed because physical storage is shared across backup directories. A deduplicating storage system consists of several levels of logical data abstraction above the physical disk storage. At the highest level, a logical namespace exists which allows a user to access data stored on the disk through an external application which resides on a client. A user can access data through any of the following protocols: virtual tape libraries (VTL), Data Domain BOOST, Common Internet File system (CIFS), and Network File System (NFS). Each namespace references/represents one or more hierarchies of one or more directories, and stored within each directory are files, e.g., user text files, audio or video files. Files, in turn, are segmented into a collection of data segments/chunks which are stored on a physical disk. In a deduplicated storage system, the data segments are hashed to create fingerprints, which are used in determining whether the data segment already exists on the physical disk. If the generated fingerprint does not match a collection of fingerprints that is currently stored on the storage system (i.e., the data segment does not currently exist on the storage system), the data segment is written to the physical disk storage, and the new fingerprint is added the existing collection of fingerprints representing the existing data segments on the physical disk storage. On the other hand, if the fingerprint of a new data segment matches a fingerprint in the collection of existing fingerprints, then the data segment is not stored onto the physical data storage.

Deduplication is performed across all data on the entire storage system. Thus, a backup directory cannot be clearly associated with the physical storage space it occupies because the same storage space may be shared by multiple backup directories. Conventional block quota and file quota systems do not provide status of storage usage which accounts for deduplication, resulting in under provisioning of the storage system. Some backup applications have started using the deduplication ratio in an effort to enforce quotas more efficiently. A deduplication ratio is derived by dividing the used logical space by the used physical space. This deduplication ratio is then applied against the logical size of the files to estimate the physical space the files will require. However, there are two problems with this quota system. First, the deduplication ratio must be calculated using the entire back up appliance logical and physical space, since there is no measurement for back up directory physical used space. Second, deduplication ratio of all data on the storage system dynamically changes as new backup files are added and old backup files are expired. Thus, an erroneous high deduplication ratio leads to over provisioning that may cause backup files to fail as the storage system physical space usage reaches full capacity. Conversely, an erroneous low deduplication ratio leads to under provisioning and the storage system will not utilize all available physical storage space. Thus, using the deduplication ratio to derive a fixed block quota is problematic.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
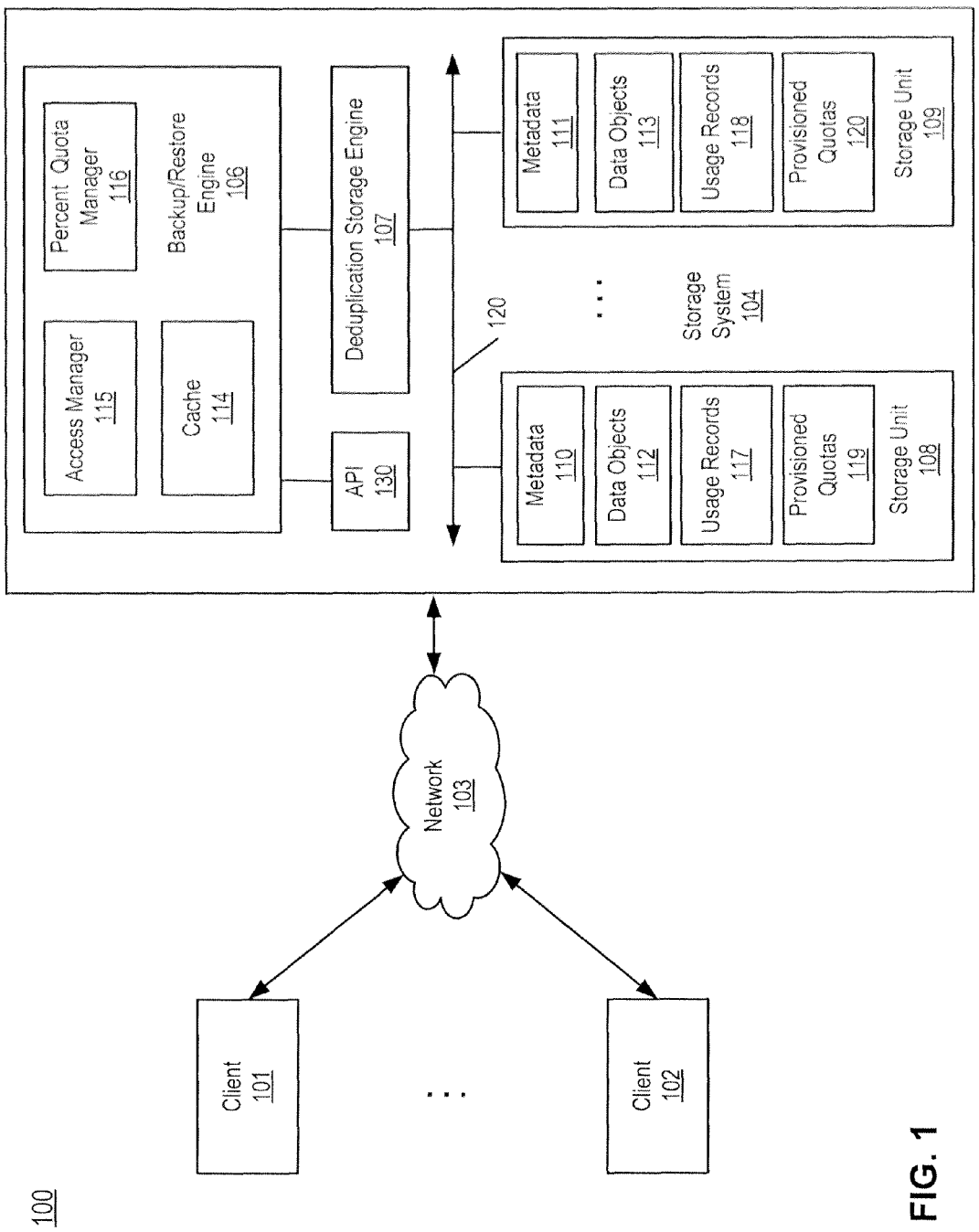
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Throughout the description, a percent quota system is described with respect to a directory of a file system. However, it will be appreciated that the percent quota system of the present invention is not so limited. The mechanisms discussed herein are equally applicable to any logical partition of a file system, including, for example, a logical file system namespace.

According to some embodiments, in response to data being written to the storage system, usage records are updated. In one embodiment, the usage records include: an appliance logical size record, which represents the size/sum of all logical files maintained by the storage system; a directory logical size record, which represents the size/sum of all logical files maintained by a particular directory on the storage system; an appliance physical used record, which represents the sum/size of physical space of the storage system used after deduplication and compression has been performed on the logical files; and an appliance physical available record, which represents the physical space available on the storage system. In one embodiment, the usage records are used by a percent quota manager to determine a percentage of the storage system available to a directory. In such an embodiment, the percent quota manager determines a directory logical percent record of the directory by dividing the directory logical size record by the appliance logical size record, and multiplying the quotient by a predetermined constant 100, the result representing the percentage of the storage system logical space used by the directory.

In one embodiment, the percent quota manager then determines the directory physical used record based on (e.g., by multiplying) the directory logical percent record by the appliance physical used record representing the physical space used by the directory. The directory percent used record is then determined based on (e.g., by dividing) the directory physical used record by the appliance physical capacity, and based on (e.g., multiplying) the result by a constant 100, the directory percent used record representing the percentage of the storage system physical space used by the directory. In one embodiment, the percentage of the storage system physical space available to the directory is then determined based on (e.g., by subtracting) the directory percent used record from a provisioned percent quota, dividing the difference by 100, and based on (e.g., multiplying) the quotient by the appliance physical space available.

According to one aspect of the invention, the percentage of the storage system physical space available to the directory is determined periodically at predetermined intervals. In another embodiment, the percentage of the storage system physical space available to the directory is determined after a new file represented by the directory is written to the storage system. In another embodiment, the percentage of the storage system physical space available to the directory is determined in response to a request to write to the directory. In yet another embodiment, the percentage of the storage system physical space available to the directory is determined in response to a request by an administrator.

Referring now to the Figures in which like numerals represent the same or similar elements, and initially to FIG. 1, which is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers (e.g., cloud servers). For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup/restore engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In response to a data file to be stored in storage units 108-109, deduplication storage engine 107 is configured to segment the data file into multiple segments according to a variety of segmentation policies or rules. Deduplication storage engine 107 may choose not to store a segment in a storage unit if the segment has been previously stored in the storage unit. In the event that deduplication storage engine 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data segment, a compression region (CR) of data segments, or a container of one or more CRs. Fingerprints are mapped to a particular data object via metadata 110-111, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, according to one embodiment, backup engine 106 includes cache 114, access manager 115, and percent quota manager 116. Access manager 115 is to provide file services to a variety of clients, such as a backup/restore application, to backup files stored in storage units 108-109, in this example, represented as data objects 112-113 that are deduplicated by deduplication storage engine 107. Typically, when a request is received to access a file such as a backup file, data objects of the requested file are loaded into a memory of storage system 104. Since the file may be large, only a portion of data objects of the file is loaded or cached in the memory at a time for accessing.

In one embodiment, percent quota calculator or manager 116 is responsible for determining the percentage of physical space available to various directories based on the current usage by the directories, the provisioned percent quota, and/or the current availability of the physical space of the storage system. For example, percent quota manager 116 may access usage records 117-118 and provisioned quotas 119-120 from storage units 108-109, and compute/determine intermediate values/records (such as records 311-314 of FIG. 3), which may be stored in cache 114. Details of the computation of these records shall become apparent through the discussion below. In one embodiment, usage records 117-118 are updated as data is deduplicated and written onto storage units 108-109. In one embodiment, provisioned quotas 119-120 are updated by an administrator through application programming interface (API) 130. According to one embodiment, provisioned quotas 119-120 may be shared by all directories on the storage system. In another embodiment, one or more file namespaces may be assigned their own unique provisioned percent quotas. Note that usage records 117-118 and provisioned quotas 119-120 may be dynamically calculated (e.g., in memory) in response to a request, without having to cache them in storage units 108-109.

Figure 2:
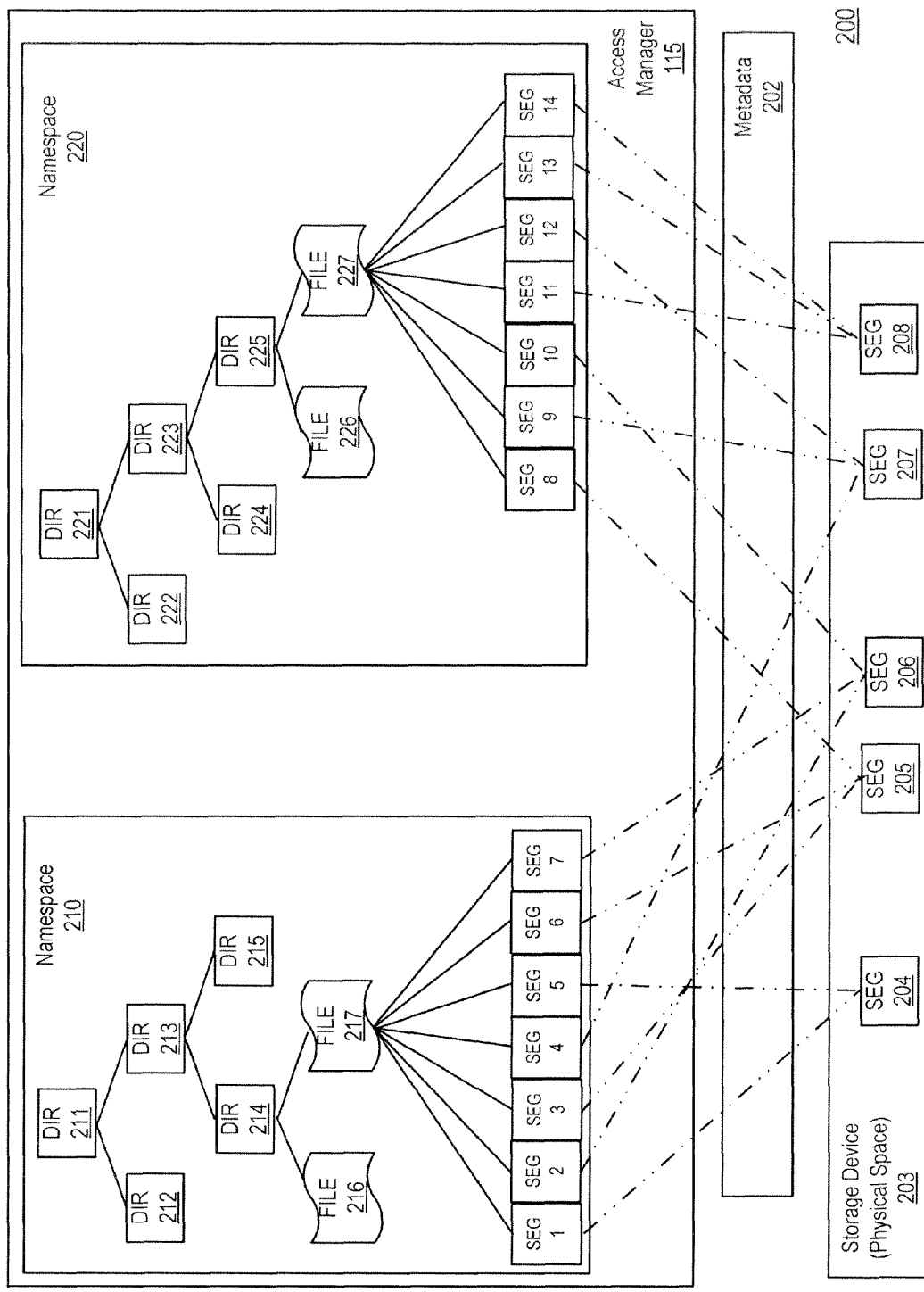
FIG. 2 is a block diagram of an access manager according to one embodiment of the invention.

FIG. 2 is a block diagram illustrating an embodiment of storage system 104. Logical file system namespaces represent a collection of one or more directories, each directory may include one or more files. For example, as illustrated in FIG. 2, namespace 210 includes directory 211, which includes subdirectories 212-213; subdirectory 213, in turn, includes subdirectories 214-215; subdirectory 214 includes files 216-217. Namespace 220 represents a collection of directories 221-227, with files 226-227 contained in subdirectory 225.

As discussed above, when files are written to the storage system, they are deduplicated before being written onto physical storage such as storage device 203. Thus, for example, file 217 is "divided up" into segments 1-7, and file 227 is divided into segments 8-14. However, because of deduplication, not every segment of the files is written to storage device 203. As illustrated in FIG. 2, segments 1 and 5 of file 217 are stored on physical storage 203 only once as a single segment 204 because they contain the same data; segments 3 and 6 of file 217, and segment 8 of file 227 are stored only once as a single segment 205; segments 2 and 7 of file 217, and segment 10 of file 227 are stored only once as a single segment 206; segments 4 of file 217, and segments 9 and 12 of file 227 are stored only once as segment 207; and segments 11, 13, and 14, of file 227 are stored only once as segment 208. Thus, although files 217 and 227 may each have a logical size of seven segments, the actual physical size of each file after deduplication is less than seven segments, and a mechanism for provisioning the storage system to a namespace must take this into account.

Figure 3:
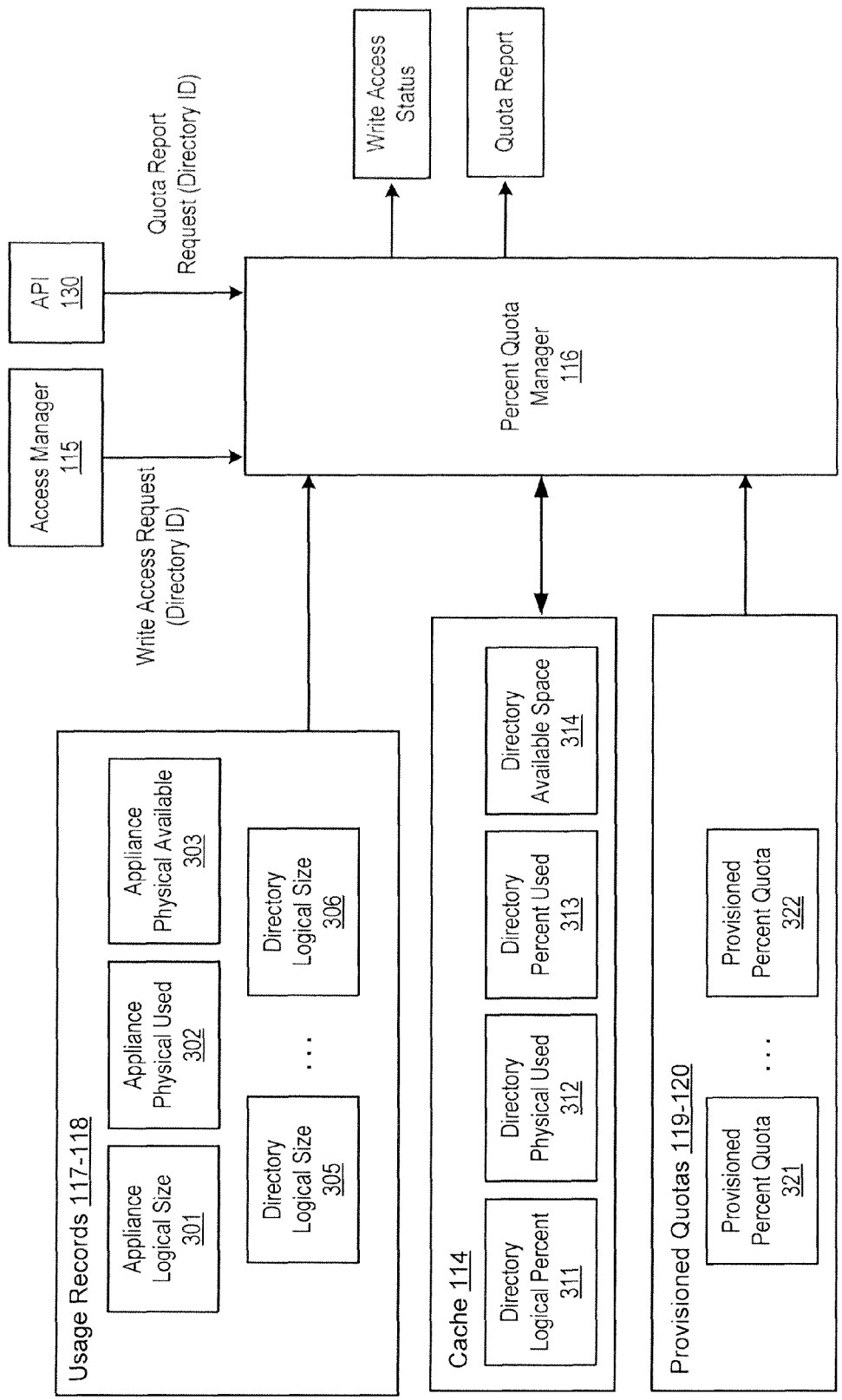
FIG. 3 is a block diagram illustrating an embodiment of a percent quota system.
Figure 4:
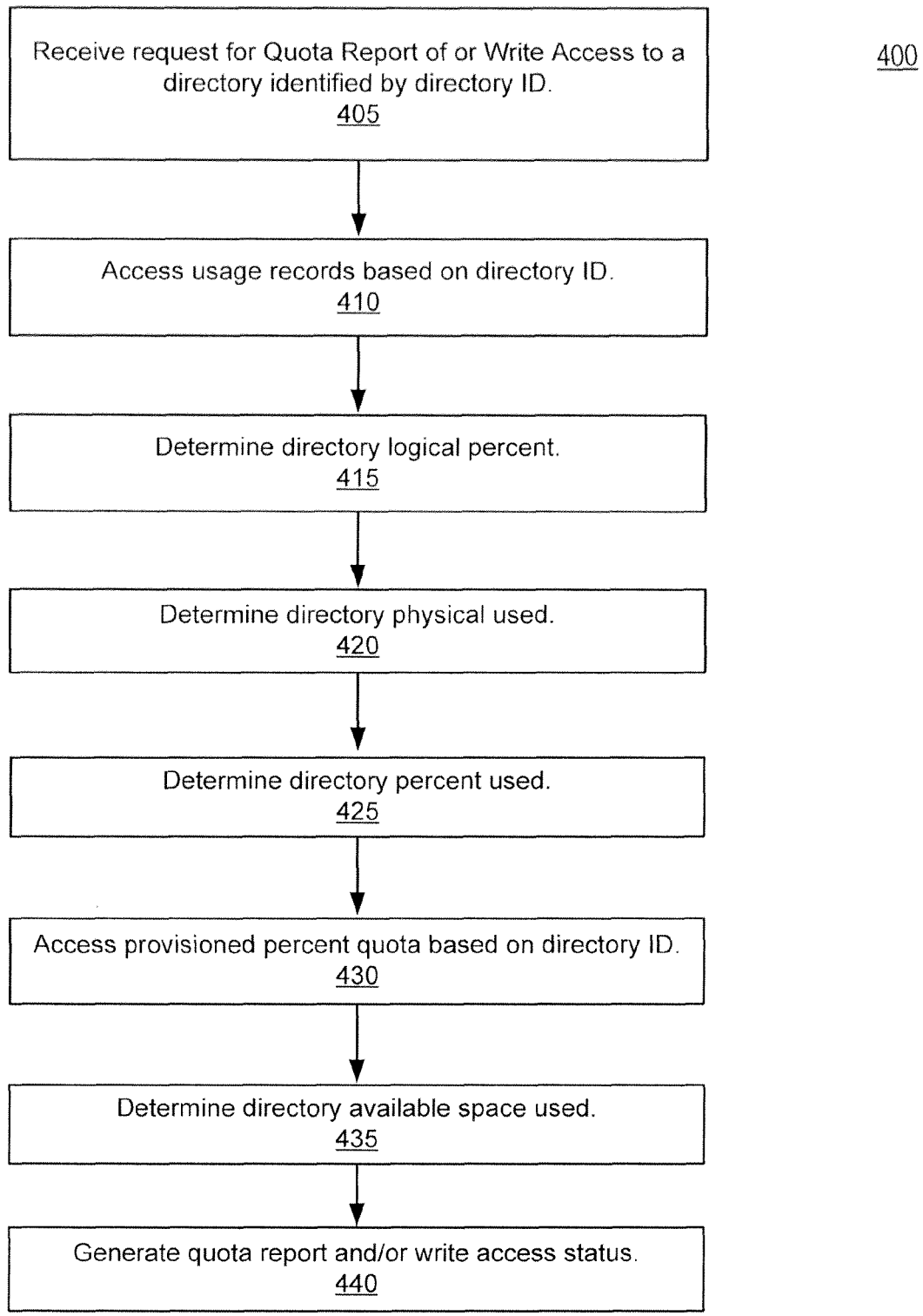
FIG. 4 is a flow diagram illustrating an embodiment of a percent quota system.

FIG. 3 is a block diagram illustrating one embodiment of storage system 300 for provisioning physical storage space. System 300 is best illustrated in conjunction with a discussion of method 400 of FIG. 4. Referring now to FIG. 4, at block 405, a request by access manager 115 to write a file to a directory identified by directory identifier (ID) is received by percent quota manager 116. Alternatively, or in addition, at block 405, percent quota manager 116 may receive a request to generate a quota report for a directory identified by directory ID from a system administrator through API 130.

At block 410, percent quota manager 116 accesses usage records 117-118 from storage units 108-109. In one embodiment, usage records 117-118 include, but are not limited to, appliance logical size record 301, appliance physical used record 302, appliance physical available record 303, and one of directory logical size records 305-306. In one embodiment, the directory logical size record accessed is based on the director ID received at block 405.

According to one embodiment, appliance logical size record 301 represents the size/sum of all logical files maintained by the entire storage system, e.g., the size of all backup files of all namespaces on the storage system before deduplication. In one embodiment, directory logical size record 305 represents the size/sum of all logical files maintained by a particular directory/namespace on the storage system. In one embodiment, appliance physical used record 302 represents the sum/size of physical space used by all directories/namespaces on the storage system after deduplication and compression has been performed on the logical files. In one embodiment, appliance physical available record 303 represents the physical space available on the storage system, which may be determined by subtracting the appliance physical used record 302 from the total physical storage capacity of the storage system.

At block 415, percent quota manager 116 determines the directory logical percent record 311 of the directory by dividing the directory logical size record (corresponding to the directory ID) by the appliance logical size record 301, and multiplying the quotient by a constant 100, the result representing the percentage of the storage system logical space used by the directory identified by directory ID.

At block 420, percent quota manager 116 determines the directory physical used record 312 by multiplying the directory logical percent record 311 by the appliance physical used record 302, the resulting directory physical used record 312 representing the physical space used by the directory identified by directory ID.

At block 425, percent quota manager 116 determines the directory percent used record 313 by dividing the directory physical used record 312 by the appliance physical capacity, and multiplying the result by a constant 100, the directory percent used record 313 representing the percentage of the storage system physical space used by the directory identified by directory ID.

At block 430, percent quota manager 116 accesses one of provisioned percent quotas 321-322 based on the directory ID. At block 435, percent quota manager 116 determines the directory available space record 314 by subtracting the directory percent used record 313 from the provisioned percent quota corresponding to the directory ID, and multiplying the difference by the appliance physical available record 303. In one embodiment, if the directory percent used record 313 exceeds the provisioned percent quota, the directory is considered full.

At block 440, percent quota manager 116 generates a quota report for the directory identified by directory ID, and/or generates a status indicating whether a write access to the directory is permitted based on the determined directory available space record 314. In one embodiment, the records determined by percent quota manager 116 during blocks 415-435 are stored as part of cache 114.

The logic blocks of method 400 of FIG. 4 are illustrated as a sequence of operations. However, it will be appreciated that not all blocks are required to be performed. For example, blocks 410-440 may be performed after a write to a directory identified by directory ID, even if the request(s) are not received at block 405. It will be further appreciated that the logic blocks of method 400 may be performed by software, firmware, hardware, or any combination therewith.

Figure 5A:
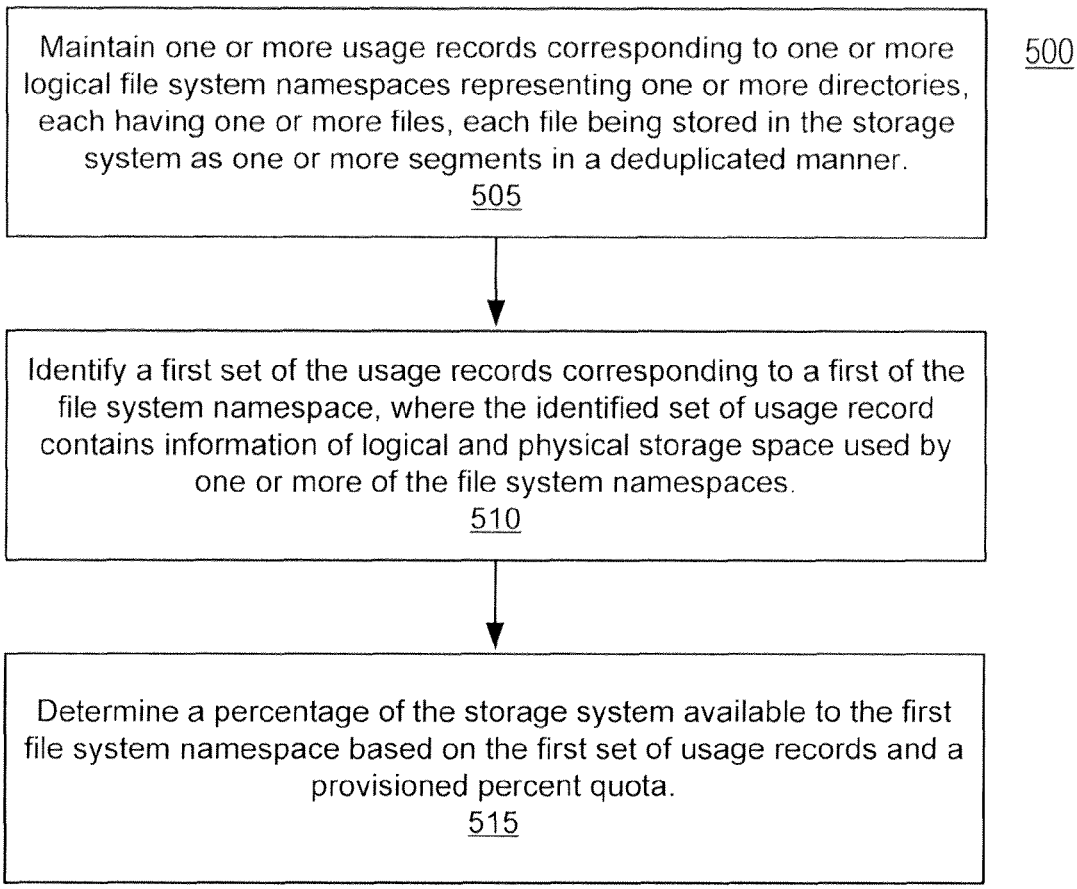
FIG. 5A is a flow diagram illustrating an embodiment of a percent quota system.

FIG. 5A is a flow diagram illustrating a method 500 for determining a percentage of a storage system available to a file system namespace. Method 500 may be performed by percent quota manager 116 and/or deduplication storage engine 107, both of which may be implemented as processing logic in software, firmware, hardware, or any combination therewith. Referring now to FIG. 5A, at block 505, the deduplication engine maintains one or more usage records corresponding to one or more logical system namespaces representing one or more directories, each having one or more files, each file being stored in the storage system as one or more segments in a deduplicated manner. For example, in response to a request by access manager 115 to write a file corresponding to a namespace, such as namespace 210 or 220 of FIG. 2, the deduplication storage engine deduplicates the segments of the file and writes the deduplicated segments to the storage system. Once the deduplicated segments are stored on physical storage, the deduplication storage engine updates the usage records such as records 301-303 of FIG. 3. In one embodiment, the deduplication storage engine also updates one of directory logical size records 305-306 based on an ID identifying the namespace that the file is to be written to.

At block 510, percent quota manager 116 identifies a first set of the usage records corresponding to a first of the file system namespace, where the identified set of usage records contains information of logical and physical storage space used by one or more of the file system namespaces. For example, in response to receiving a request to generate a quota report from a system administrator via API 130, and/or in response to a request from access manager 115 to write a file corresponding to a file system namespace, percent quota manager 116 identifies a first record (e.g., appliance logical size record 301), a second record (e.g., a directory logical size record selected from the directory logical size records 305-306 based on an ID of the namespace), a third record (appliance physical used record 303), and a fourth record (e.g., appliance physical available record 303).

At block 515, percent quota manager 116 determines a percentage of the storage system available to the first file system namespace based on the identified set of usage records and a provisioned percent quota, which is selected from one of provisioned percent quota records 321-322 based on an ID of the namespace.

FIG. 5A illustrates method 500 as a sequential of set of operations. However, it will be appreciated that not all operations are required to be performed. For example, block 505 may be performed without having to perform blocks 510-515 if the percent quota manager does not receive a request to determine the percentage of the storage system available to a particular namespace. It will be further appreciated that where all blocks are performed, they are not required to be performed in the order as illustrated. Blocks 505-515 may be performed by software, firmware, hardware, or any combination therewith.

Figure 5B:
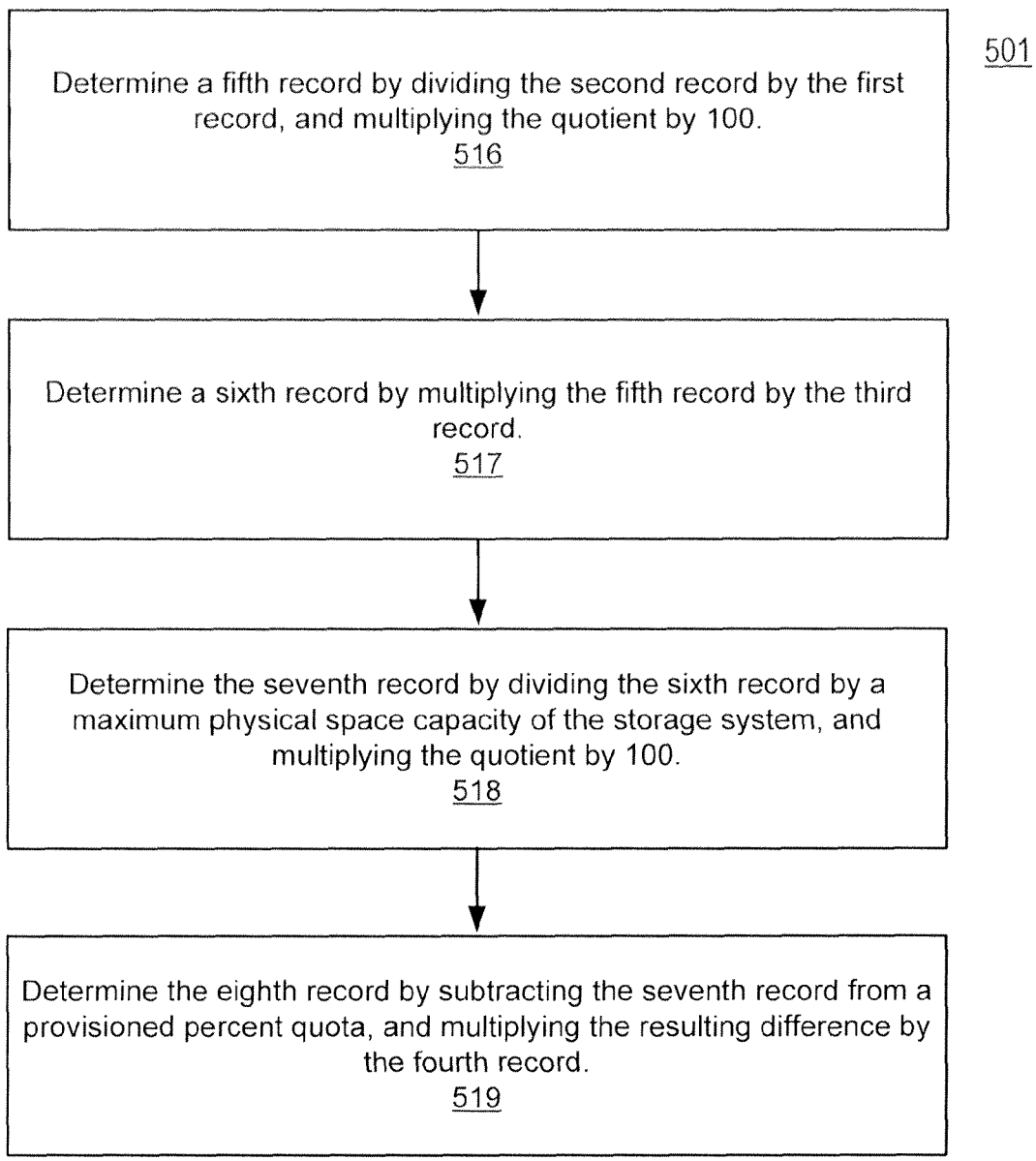
FIG. 5B is a flow diagram illustrating an embodiment of a percent quota system.

FIG. 5B is a flow diagram illustrating a method 501 for determining a percentage of the storage system available to a namespace. In one embodiment, method 501 is performed by percent quota manager 116 as part of block 515 of FIG. 5A. For example, method 501 assumes that a first, second, third, and fourth record has been identified as part of the first set of usage records during block 510 of FIG. 5A. Referring now to FIG. 5B, at block 516, percent quota manager 116 determines a fifth record by dividing the second record by the first record, and multiplying the quotient by a constant 100. For example, percent quota manager 116 determines directory logical percent record 311 by dividing a directory logical size record selected from records 305-306 by appliance logical size record 301, and multiplying the resulting quotient by a constant 100.

At block 517, percent quota manager 116 determines a sixth record by multiplying the fifth record by the third record. For example, percent quota manager 116 determines directory physical used record 312 by multiplying directory logical percent 311 by appliance physical used record 302. At block 518, percent quota manager 116 determines a seventh record by dividing the sixth record by a maximum physical space capacity of the storage system. For example, percent quota manager 116 determines directory percent used record 313 by dividing directory physical used record 312 by the maximum physical capacity of the appliance, and multiplying the quotient by a constant 100. At block 519, percent quota manager 116 determines the eighth record by subtracting the seventh record from a provisioned percent quota selected from provisioned percent quota records 321-322, and multiplying the difference by the forth record. For example, the percent quota manager determines directory available space record 314 by subtracting directory percent used record 313 from a provisioned percent quota selected from provisioned percent quota records 321-322, and multiplying the resulting difference by appliance physical available record 303.

The percent quota provisioning mechanism of the present invention can be illustrated by way of example. For the purpose of the following first example, assume:

Appliance physical available (capacity)=maximum storage on appliance 16000 MB.
Appliance physical used=actual storage used on appliance=400 MB.
Provisioned percent quota for first user=25%
Provisioned percent quota for second user=50%
Provisioned percent quota for third user=12.5%
Provisioned percent quota for fourth user=12.5%

Assume further that each user has written to a directory of the appliance, and the logical sizes are:

User 1 Directory logical size=1400 MB
User 2 Directory logical size=1600 MB
User 3 Directory logical size=800 MB
User 4 Directory logical size=200 MB Thus, the sum of all directory logical size, i.e., the appliance logical size, is 4000 MB, and the individual directory logical percent used are:

User 1 Directory logical percent=1400/4000=35%
User 2 Directory logical percent=1600/4000=40%
User 3 Directory logical percent=800/4000=20%
User 4 Directory logical percent=200/4000=5%

However, due to deduplication, all the users are actually using less physical storage than their logical size implies. By using the percent quota provisioning mechanism of the present invention, the individual directory physical used and the directory percent used can be computed as follows:

User 1 Directory physical used=35%*400=140 MB
User 2 Directory physical used=40%*400=160 MB
User 3 Directory physical used=20%*400=80 MB
User 4 Directory physical used=5%*400=20 MB Thus, User 1 Directory percent used=140/16000=0.875%
User 2 Directory percent used=160/16000=0.1%
User 3 Directory percent used=80/16000=0.5%
User 4 Directory percent used=20/16000=0.125%

As illustrated above, by using the mechanisms of the present invention, a system administrator will be more accurately informed of the users' usage of the deduplicated storage system. In particular, based on the above parameters, user 1, 2, 3, and 4, have only actually used up 0.875%, 0.1%, 0.5%, and 0.125%, respectively, of the storage system. Since the storage system is provisioned based on percentage instead of fixed logical space, the users still have free space based on the provisioned percent quota. In this first example, the remaining available physical storage available are as follows:

User 1 Directory available space: (25%−0.875%)*16000=3860 MB
User 2 Directory available space: (50%−0.1%)*16000=7840 MB
User-3 Directory available space: (12.5%−0.5%)*16000=1920 MB
User-4 Directory available space: (12.5%−0.125%)*16000=1980 MB The advantages of the present percent quota provisioning mechanism can be illustrated by contrasting the above first example with the following second example, wherein the parameters are identical, and the only difference is that in the second example, provisioning is done by block quotas. Although the parameters of the second example are the same as the first example, they are repeated here for convenience:

Appliance physical available (capacity)=maximum storage on appliance 16000 MB.
Appliance physical used=actual storage used on appliance=400 MB.
Provisioned block quota for first user=4000 MB (equivalent to 25%)
Provisioned block quota for second user=8000 MB (equivalent to 50%)
Provisioned block quota for third user=2000 MB (equivalent to 12.5%)
Provisioned block quota for fourth user=2000 MB (equivalent to 12.5%)

Assume further that each user has written to a directory of the appliance, and the logical sizes are:

User 1 Directory logical size=1400 MB
User 2 Directory logical size=1600 MB
User 3 Directory logical size=800 MB
User 4 Directory logical size=200 MB Since the conventional provisioning mechanism uses block quotas, the available space can only be computed based on logical space used. Using the above parameters, the available space for the users are as follows (which are compared to the available space computed using the percent quota mechanism discussed above in the first example):

User 1 Directory available space: 4000−1400=2600 MB (compared to 3860 MB)
User 2 Directory available space: 8000−1600=6400 MB (compared to 7840 MB)
User-3 Directory available space: 2000−800=1200 MB (compared to 1920 MB)
User-4 Directory available space: 2000−200=1800 MB (compared to 1980 MB)

Based on the illustrated examples, it is clear that the block quota provisioning mechanism results in under provisioning of a storage system. Furthermore, there is no way to accurately predict the logical space that an appliance will accommodate for a given physical space and deduplication ratio (which itself is also difficult to predict as files are written to and/or deleted from the system). Therefore, by provisioning a storage system based on percent quotas instead of logical or physical (e.g., mega bytes), all users of the storage system can benefit from the deduplication capability of the appliance.

Figure 6:
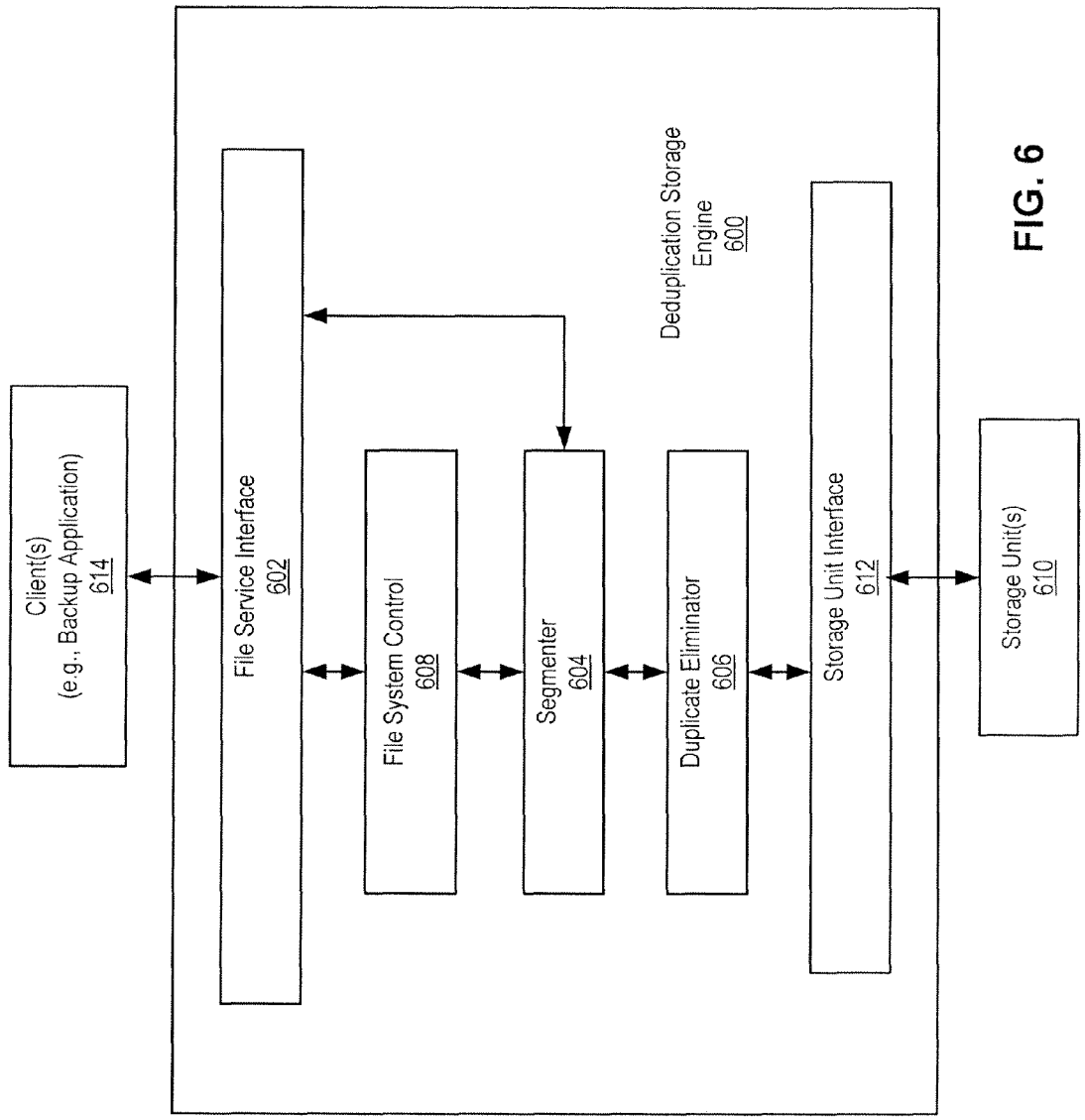
FIG. 6 is a block diagram illustrating a deduplicated storage system according to one embodiment of the invention.

FIG. 6 is a block diagram illustrating a segment storage engine according to one embodiment of the invention. For example, deduplication storage engine 600 may be implemented as part of a deduplication storage system as described above, such as deduplication storage engine 107 of FIG. 1. Referring to FIG. 6, in one embodiment, deduplication storage engine 600 includes file service interface 602, segmenter 604, duplicate eliminator 606, file system control 608, and storage unit interface 612. Deduplication storage engine 600 receives a file or files (or data item(s)) via file service interface 602, which may be part of a file system namespace of a file system associated with the deduplication storage engine 600.

The file system namespace refers to the way files are identified and organized in the system. An example is to organize the files hierarchically into directories or folders. File service interface 612 supports a variety of protocols, including a network file system (NFS), a common Internet file system (CIFS), and a virtual tape library interface (VTL), etc.

The file(s) is/are processed by segmenter 604 and file system control 608. Segmenter 604 breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 608 processes information to indicate the segment(s) association with a file. In some embodiments, a list of fingerprints is used to indicate segment(s) associated with a file. File system control 608 passes segment association information (e.g., representative data such as a fingerprint) to an index (not shown). The index is used to locate stored segments in storage units 610 via storage unit interface 612. Duplicate eliminator 606 identifies whether a newly received segment has already been stored in storage units 610. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 610 that make up the file. Segments are then packed by a container manager (not shown) into one or more storage containers stored in storage units 610. The deduplicated segments may be further compressed using a variation of compression algorithms, such as a Lempel-Ziv algorithm before being stored.

When a file is to be retrieved, file service interface 602 is configured to communicate with file system control 608 to identify appropriate segments stored in storage units 610 via storage unit interface 612. Storage unit interface 612 may be implemented as part of a container manager. File system control 608 communicates with an index (not shown) to locate appropriate segments stored in storage units via storage unit interface 612. Appropriate segments are retrieved from the associated containers via the container manager and are used to construct the requested file. The file is provided via interface 602 in response to the request. In one embodiment, file system control 608 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed:

1. A computer-implemented method for provisioning of a storage system based on percent quotas, the method comprising:

maintaining a plurality of usage records corresponding to a plurality of logical file system namespaces representing one or more directories each having one or more files, each file being stored in the storage system as a plurality of segments in a deduplicated manner;

identifying a first set of the usage records corresponding to a first of the file system namespaces, wherein the first set of usage records contains information of logical and physical storage space used by one or more of the file system namespaces; and determining a percentage of the storage system available to the first file system namespace based on the first set of usage records and a provisioned percent quota, wherein the first set of usage records comprises a first record representing a sum of logical space used by all directories and files represented by all of the file system namespaces, a second record representing a sum of logical space used by all directories and files represented by the first file system namespace, a third record representing a sum of physical space used by all directories and files represented by all of the file system namespaces after deduplication, and a fourth record representing a total physical space available on the storage system.

2. The method of claim 1, wherein determining the percentage of the storage system available to the first file system namespace comprises:
   determining a fifth record based on the second record and the first record, the fifth record representing a percentage of logical space used by all directories and files represented by the first file system namespace;
   determining a sixth record based on the fifth record and the third record, the sixth record representing a sum of physical space used by all directories and files represented by the first file system namespace.

3. The method of claim 2, wherein the fifth record is determined by dividing the second record by the first record to generate a first resulting quotient, and multiplying the first resulting quotient by 100, and wherein the sixth record is determined by dividing the fifth record by the third record.

4. The method of claim 3, wherein determining the percentage of the storage system available to the first file system namespace further comprises:
   determining a seventh record based on the sixth record and a maximum physical space capacity of the storage system, the seventh record representing a percentage of a physical space used by all directories and files represented by the first file system namespace;
   determining an eighth record based on the provisioned percent quota, the seventh record, and the fourth record, the eighth record representing the percentage of the storage system available to the first file system namespace.

5. The method of claim 4, wherein the seventh record is determined by dividing the sixth record by the maximum physical space capacity of the storage system to generate a second resulting quotient, and multiplying the second resulting quotient by 100, and wherein the eighth record is determined by subtracting the seventh record from the provisioned percent quota to generate a difference, dividing the difference by 100 to generate a third resulting quotient, and multiplying the third resulting quotient by the fourth record.

6. The method of claim 5, wherein the determining the percentage of the storage system available to the first file system namespace is performed after a new file represented by the first file system namespace is written to the storage system.

7. A non-transitory computer-readable storage medium having instructions stored therein, which when executed by a computer, cause the computer to perform operations of provisioning a storage system, the operations comprising:
   maintaining a plurality of usage records corresponding to a plurality of logical file system namespaces representing one or more directories each having one or more files, each file being stored in the storage system as a plurality of segments in a deduplicated manner;
   identifying a first set of the usage records corresponding to a first of the file system namespaces, wherein the first set of usage records contains information of logical and physical storage space used by one or more of the file system namespaces; and
   determining a percentage of the storage system available to the first file system namespace based on the first set of usage records and a provisioned percent quota, wherein the first set of usage records comprises a first record representing a sum of logical space used by all directories and files represented by all of the file system namespaces, a second record representing a sum of logical space used by all directories and files represented by the first file system namespace, a third record representing a sum of physical space used by all directories and files represented by all of the file system namespaces after deduplication, and a fourth record representing a total physical space available on the storage system.

8. The non-transitory computer-readable storage medium of claim 7, wherein determining the percentage of the storage system available to the first file system namespace comprises:
   determining a fifth record based on the second record and the first record, the fifth record representing a percentage of logical space used by all directories and files represented by the first file system namespace;
   determining a sixth record based on the fifth record and the third record, the sixth record representing a sum of physical space used by all directories and files represented by the first file system namespace.

9. The non-transitory computer-readable storage medium of claim 8, wherein the fifth record is determined by dividing the second record by the first record, and multiplying the resulting quotient by 100, and the sixth record is determined by dividing the fifth record by the third record.

10. The non-transitory computer-readable storage medium of claim 9, wherein determining the percentage of the storage system available to the first file system namespace further comprises:
   determining a seventh record based on the sixth record and a maximum physical space capacity of the storage system, the seventh record representing a percentage of a physical space used by all directories and files represented by the first file system namespace;
   determining an eighth record based on the provisioned percent quota, the seventh record, and the fourth record, the eighth record representing the percentage of the storage system available to the first file system namespace.

11. The non-transitory computer-readable storage medium of claim 10, wherein the seventh record is determined by dividing the sixth record by maximum physical space capacity of the storage system, and multiplying the quotient by 100, and the eighth record is determined by subtracting the seventh record from a provisioned percent quota, dividing the difference by 100, and multiplying the resulting quotient by the fourth record.

12. The non-transitory computer-readable storage medium of claim 11, wherein the determining the percentage of the storage system available to the first file system namespace is performed after a new file represented by the first file system namespace is written to the storage system.

13. A data processing system, comprising:
   a processor; and
   a memory to store instructions, which when executed from the memory, cause the processor to
      maintain a plurality of usage records corresponding to a plurality of logical file system namespaces representing one or more directories each having one or more files, each file being stored in the storage system as a plurality of segments in a deduplicated manner,
      identify a first set of the usage records corresponding to a first of the file system namespaces, wherein the first set of usage records contains information of logical and physical storage space used by one or more of the file system namespaces, and determine a percentage of the storage system available to the first file system namespace based on the first set of usage records and a provisioned percent quota, wherein the first set of usage records comprises a first record representing a sum of logical space used by all directories and files represented by all of the file system namespaces, a second record representing a sum of logical space used by all directories and files represented by the first file system namespace, a third record representing a sum of physical space used by all directories and files represented by all of the file system namespaces after deduplication, and a fourth record representing a total physical space available on the storage system.

14. The system of claim 13, wherein determining the percentage of the storage system available to the first file system namespace comprises:

determining a fifth record based on the second record and the first record, the fifth record representing a percentage of logical space used by all directories and files represented by the first file system namespace;

determining a sixth record based on the fifth record and the third record, the sixth record representing a sum of physical space used by all directories and files represented by the first file system namespace.

15. The system of claim 14, wherein the fifth record is determined by dividing the second record by the first record, and multiplying the resulting quotient by 100, and the sixth record is determined by dividing the fifth record by the third record.

16. The system of claim 15, wherein determining the percentage of the storage system available to the first file system namespace further comprises:

determining a seventh record based on the sixth record and a maximum physical space capacity of the storage system, the seventh record representing a percentage of a physical space used by all directories and files represented by the first file system namespace;

determining an eighth record based on the provisioned percent quota, the seventh record, and the fourth record, the eighth record representing the percentage of the storage system available to the first file system namespace.

17. The system of claim 16, wherein the seventh record is determined by dividing the sixth record by maximum physical space capacity of the storage system, and multiplying the quotient by 100, and the eighth record is determined by subtracting the seventh record from a provisioned percent quota, dividing the difference by 100, and multiplying the resulting quotient by the fourth record.

18. The system of claim 17, wherein the determining the percentage of the storage system available to the first file system namespace is performed after a new file represented by the first file system namespace is written to the storage system.

* * * * *